Sept. 30, 1952      I. C. BLAKE      2,612,533
PRIMARY CELL
Filed May 29, 1951
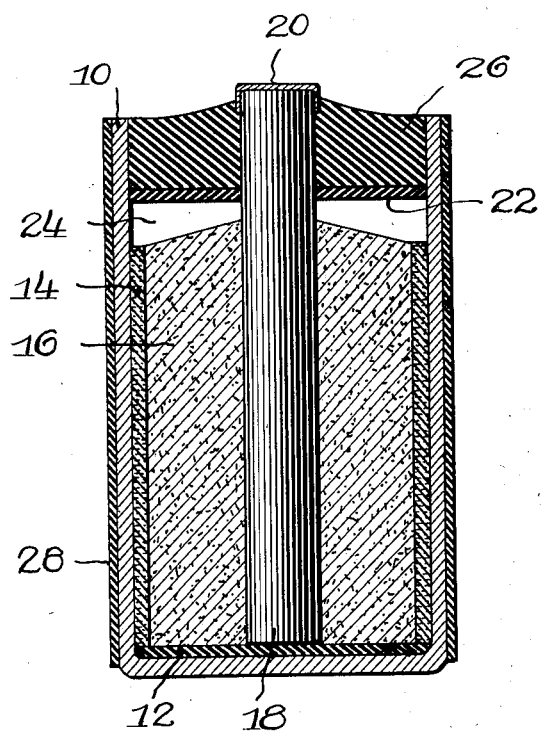
Inventor,
Ivan C. Blake
By: Jones, Tesch + Darbo
Attys Patented Sept. 30, 1952

2,612,533

UNITED STATES PATENT OFFICE 2,612,533

PRIMARY CELL

Ivan C. Blake, Freeport, Ill., assignor to Burgess Battery Company, Freeport, Ill., a corporation of Delaware Application May 29, 1951, Serial No. 228,833

7 Claims. (Cl. 136—93)

This invention relates to improvements in current-producing primary cells and particularly to cells of this character having a magnesium negative electrode.

A primary cell having a magnesium negative electrode and an aqueous electrolyte has been developed and is described in an article entitled "Magnesium Dry Cells" by R. C. Kirk and A. B. Fry, J. Electrochemical Society, volume 94, pages 277–289, and also in United States Patent 2,547,-907, and the present invention relates to an improvement in cells of this character whereby their capacity, both fresh and after being in storage, is increased.

Briefly, in the cell which is known, the negative and positive electrodes are composed of magnesium and carbon and the carbon electrode is embedded in a depolarizing mix similar to that employed in the conventional Leclanché cell and composed of a mixture of powdered manganese dioxide and carbon, and the electrolyte is an aqueous solution of a bromide such as magnesium bromide. A small amount of barium chromate, $BaCrO_4$, is included in the depolarizing mix to inhibit spontaneous corrosion of the magnesium electrode and provide increased capacity and improved shelf life.

In accordance with the present invention, it has been discovered that in a cell of the character described, the use of a double chromate of barium from the group consisting of barium potassium chromate, $BaK_2(CrO_4)_2$, barium sodium chromate, $BaNa_2(CrO_4)_2$ and barium ammonium chromate, $Ba(NH_4)_2(CrO_4)_2$, provides capacity and shelf life which is very substantially increased over that obtained with the use of barium chromate.

It is, accordingly, the object of the invention to provide an improved primary cell of the character described having substantially increased capacity and shelf life.

To provide an understanding of the invention, it will be described in connection with a specific embodiment of a primary cell. This is done by way of illustration and not of limitation, however, since the invention relates to the composition of the cell and structural forms other than that described herein may be used.

The single figure of the drawing is a sectional elevation of the embodiment of the cell.

The cell is of cylindrical shape similar to that employed in the conventional flashlight cell. The negative electrode 10 is in the form of an open-top cup and is composed of magnesium or a magnesium-base alloy. An alloy composed of 96% magnesium, 3% aluminum and 1% zinc is very suitable for use, and when the term "magnesium" is used herein it is intended to embrace magnesium-base alloys of the general character described.

Upon the bottom of cup 10 is a layer 12 of non-conductive material, such as paper or pulp-board which is impregnated with a material such as wax so as to be impervious to the electrolyte. If desired, the layer 12 may be unimpregnated so that it is pervious to the electrolyte. Located centrally within the cup 10 and resting upon the layer 12 is the body 16 of depolarizing mix which is a mixture of finely divided particles of a suitable oxidizing agent and a conductive substance, such as manganese dioxide and carbon.

Between the mix body 16 and the interior surface of magnesium cup 10 is a separating layer 14 which may be composed of gelatinized starch or a bibulous sheet such as absorbent paper. The depolarizing mix 16 and separator 14 are moistened with the electrolyte which is an aqueous solution of a bromide such as the bromide of an alkali metal, an alkaline earth metal, or ammonium bromide. Examples of the alkali metal and alkaline earth bromides which may be used are the bromides of magnesium, lithium, calcium, strontium, sodium and potassium. Magnesium bromide is preferred, and an example of a suitable electrolyte is an aqueous solution containing about 300 to 400 grams per liter of $MgBr_2.6H_2O$. If a gel is used instead of a bibulous sheet for separator 14, this may be composed of the described electrolyte with the addition of a suitable amount of starch or a mixture of starch and cereal flour such as wheat flour. The composition is heated to gelatinize the cereal. A gel separator which does not require heating for gelatinization may be made by increasing the concentration of the electrolyte compound in the described electrolyte.

Embedded within the mix body 16 and projecting upwardly therefrom is the carbon rod positive electrode 18 which has a conductive terminal cap 20 of metal such as brass fitting upon the top end thereof. Spaced above the mix 16 and separator 14 is the washer 22 of non-conductive material such as cardboard which fits tightly upon the carbon rod 18 and against the interior surface of the cup 10 and is thereby held in place. Upon the washer 22 is a relatively thick layer 26 of a fusible sealing composition such as wax or pitch, which is poured in the molten condition upon the washer 22 and upon solidification forms a seal closure for the open top of the cup 10.

The space 24 between the washer 22 and the top of the mix body 16 is an expansion space for the accommodation of gases which may be formed during the operation of the cell. A cylindrical jacket 28 of a suitable non-conductive material such as cardboard or the like fits upon the exterior side wall of the cup 10 and provides protection and insulation against exterior objects.

In accordance with the present invention, a double chromate of barium from the group consisting of barium potassium chromate, barium sodium chromate and barium ammonium chromate is included in the cell to increase the capacity and shelf life thereof. The barium potassium chromate consists substantially entirely of the true double chromate. The two other compounds each consists predominantly of the double chromate and contains minor amounts of the two uncombined single chromates involved. The compounds will be referred to herein as the double chromates. Barium potassium chromate is preferred.

The above double chromates are sparingly soluble in water and go into solution in the electrolyte at a gradual rate. The amount of each compound which has become dissolved in 100 grams of water after standing therein at 70° F. with periodic shaking is as follows: Barium potassium chromate, 1.86 grams; barium sodium chromate, 2.38 grams; barium ammonium chromate 3.14 grams. For this reason the concentration of chromate ion in the electrolyte is very low at any time but it is constantly replenished by the undissolved excess present as it is consumed during the life of the cell.

The compound may be introduced into the cell by any desired method, as by mixing it in the electrolyte or incorporating it in the separating layer 14 or the depolarizing mix 16. It is substantially equally effective when introduced by any of such methods. The preferred method is to incorporate it in the mix 16 by mixing it with the other ingredients thereof. Since the mix is moistened with the electrolyte, the compound becomes dissolved slowly in the electrolyte and thereby is made available at the surface of the magnesium electrode. In accordance with the invention the compound is utilized by being placed in access relation to the electrolyte.

An amount of the double chromate is used which is sufficient to inhibit spontaneous corrosion of the magnesium electrode preferably for at least the life of the cell. The amount which may be used is not critical and may be varied over a relatively wide range. The total amount required for the life of the cell is only a small quantity, and an excessive amount should be avoided as the excess represents a waste of the compound and may occupy space which would otherwise be occupied to better advantage by the depolarizing mix. Amounts which have been used with success are about .0030 to .030 gram, expressed in terms of $CrO_3$, per square centimeter of magnesium electrode surface exposed to the electrolyte. An amount which provides .015 gram of $CrO_3$ per square centimeter has been used with very good results. The range given is approximately equivalent to about 0.25% to 2.5% of the total dry weight of the depolarizing mix, expressed in terms of $CrO_3$.

A small amount of lithium chromate may be included in the electrolyte for the purpose of assisting in inhibiting spontaneous corrosion of the magnesium electrode. For example, 0.05 to 0.3 gram of $Li_2CrO_4$ per liter of electrolyte may be used. For a similar reason, when an absorbent sheet such as paper is used for the separator 14 as described, a thin gel may be coated upon the surface of the sheet resting against the magnesium electrode composed of the electrolyte described heretofore containing 0.1 gram per liter of $Li_2CrO_4$ and a small amount of starch or a mixture of starch and cereal flour.

The construction which has been known heretofore is similar to that described in the foregoing with the difference that barium chromate, $BaCrO_4$, has been employed instead of the double chromates of barium which have been described. In accordance with such known construction, a small proportion of barium chromate is included in the depolarizing mix, as for example about 3% of $BaCrO_4$, based on the total dry weight of the mix. It has been found that the cell of the present invention exhibits substantially increased capacity and shelf life over the cells known heretofore.

To show the superior performance of cells in accordance with the present invention, cells were made up of the construction specifically described hereinbefore and illustrated in the drawing which were identical except that one lot contained barium potassium chromate in the depolarizing mix while the other lot contained an equal amount of barium chromate in the mix. The cells were of the conventional cylindrical flashlight type and size. The mix 16 was composed of 91 parts by weight manganese dioxide, 6 parts thermal acetylene black and 3 parts of the chromate. In lot No. 1 the chromate was barium potassium chromate in accordance with the present invention, and in lot No. 2 it was barium chromate in accordance with constructions known heretofore. One thousand grams of this dry mix was moistened with 270 grams (250 cc.) of electrolyte composed of an aqueous solution containing 300 grams per liter of $$MgBr_2.6H_2O$$

and .1 gram per liter of $Li_2CrO_4$. The mix bodies 16 were in every case of the same size and weight. The negative electrode 10 was composed of 96% by weight magnesium, 3% aluminum and 1% zinc and were in every case formed by impact extrusion and were of the same size and wall thickness.

A cold-gelled paste or gel-type electrolyte-separator 14 was made by mixing a suspension composed of 300 cc. water, 75 grams corn starch and 25 grams wheat flour with an equal volume of an aqueous solution containing 1200 grams per liter $MgBr_2.6H_2O$ and 0.4 gram per liter $Li_2CrO_4$.

The open circuit voltage of the cells of both lots when fresh was approximately 2.0 volts. The cells of both lots were stored for three months at approximately 70° F. and were then subjected to discharge performance tests as follows: Batteries of two cells connected in series were discharged through a resistance of 13.33 ohms for four minutes each half hour for ten hours per day, five days per week until an end point of 1.87 volts for each battery of two cells connected in series had been reached. This is in accordance with the Joint Army-Navy Dry Battery Specification for Battery BA—30. Two batteries of each lot were tested. Capacities are given below in days of discharge service rendered under the described test before the end point of 1.87 volt for two cells connected in series was reached, not including the two days per week when the batteries were at rest. The results were as follows:

Table No. 1

|  | Days |
|---|---|
| Lot No. 1: |  |
| Battery No. 1 | 24.75 |
| Battery No. 2 | 26.66 |
| Lot No. 2: |  |
| Battery No. 1 | 18.0 |
| Battery No. 2 | 18.0 |

After five months storage at 70° F. ten cells of each lot were tested for open circuit voltage and short circuit current, and the data for the tests are given in the table below.

Table No. 2

|  | Cell | Open circuit voltage | Current, Amperes |
|---|---|---|---|
| Lot No. 1 | 1 | 1.87 | 0.90 |
|  | 2 | 1.88 | 1.50 |
|  | 3 | 1.88 | 1.70 |
|  | 4 | 1.88 | 1.10 |
|  | 5 | 1.88 | 1.10 |
|  | 6 | 1.88 | 1.10 |
|  | 7 | 1.87 | 1.40 |
|  | 8 | 1.88 | 1.10 |
|  | 9 | 1.88 | 1.90 |
|  | 10 | 1.88 | 1.20 |
| Average |  | 1.878 | 1.30 |
| Lot No. 2 | 1 | 1.92 | 0.90 |
|  | 2 | 1.92 | 0.55 |
|  | 3 | 1.87 | 1.20 |
|  | 4 | 1.92 | 2.40 |
|  | 5 | 1.88 | 0.35 |
|  | 6 | 1.92 | 0.90 |
|  | 7 | 1.92 | 1.35 |
|  | 8 | 1.84 | 0.20 |
|  | 9 | 1.90 | 0.40 |
|  | 10 | 1.92 | 0.20 |
| Average |  | 1.901 | 0.825 |

The Army-Navy test described above does not provide for the testing of freshly made batteries, but different lots, namely lots 3 and 4, were subjected to such tests. The cells and batteries of lots 3 and 4 were similar in every respect to those of lots 1 and 2 with the exception that the proportions of the depolarizing mix were different, being 87 parts by weight of manganese dioxide, 10 parts of thermal acetylene black and 3 parts of chromate compound. In lot No. 3 the chromate compound was barium potassium chromate and in lot No. 4 it was barium chromate. The batteries were tested for capacity when fresh and the test was similar to the capacity test described heretofore. The capacity data are as follows:

Table No. 3

|  | Days |
|---|---|
| Lot No. 3: |  |
| Battery No. 1 | 29.82 |
| Battery No. 2 | 30.17 |
| Lot No. 4: |  |
| Battery No. 1 | 21.8 |
| Battery No. 2 | 26.5 |

The above data show a definite superiority in capacity and the ability to deliver current for the cell containing the double chromate over that containing barium chromate. They also show a more uniform open circuit voltage and short circuit current for the cells of the present invention. While data are given for only the cell containing barium potassium chromate, similar performance is exhibited by cells containing barium sodium chromate and barium ammonium chromate.

The reason for the improved capacity and shelf life caused by the use of the double chromates described herein is not known. It is believed, however, that it may be because the chromate ions are released in an advantageous manner. As stated heretofore, the compounds are sparingly soluble and go into solution at a gradual rate. Only a portion of the compound is in solution at any one time, and it is believed that as the compound is utilized or consumed in the action accompanying the inhibiting function, more of it is progressively dissolved and the chromate ions are released in an advantageous manner such that the capacity is favorably maintained and an increased shelf life is realized.

What is claimed is:

1. A current-producing primary cell comprising a positive electrode, a magnesium negative electrode, an electrolyte in contact with said electrodes comprising an aqueous solution of a bromide from the group consisting of magnesium, calcium, lithium, ammonium, sodium, potassium and strontium bromides; for inhibiting spontaneous corrosion of said negative electrode a compound in access relation to said electrolyte from the group consisting of barium potassium chromate, barium sodium chromate and barium ammonium chromate.

2. A current-producing primary cell comprising a positive electrode, a magnesium negative electrode, an electrolyte in contact with said electrodes comprising an aqueous solution of a bromide from the group consisting of magnesium, calcium, lithium, ammonium, sodium, potassium and strontium bromides, and a compound in access relation to said electrolyte from the group consisting of barium potassium chromate, barium sodium chromate and barium ammonium chromate in amount sufficient to provide .0030 to .030 gram of $CrO_3$ per square centimeter of negative electrode surface in contact with said electrolyte.

3. A current-producing primary cell comprising a positive electrode, a magnesium negative electrode, an electrolyte in contact with said electrodes comprising an aqueous solution of a bromide from the group consisting of magnesium, calcium, lithium, ammonium, sodium, potassium and strontium bromides, a depolarizing mix in contact with said positive electrode; for inhibiting spontaneous corrosion of said negative electrode a compound in said depolarizing mix from the group consisting of barium potassium chromate, barium sodium chromate and barium ammonium chromate, said compound being present in an amount such that the $CrO_3$ thereof comprises about 0.25% to 2.5% of the dry weight of said mix.

4. In a current-producing primary cell having a positive electrode and a magnesium negative electrode and an aqueous bromide electrolyte in contact with said electrodes; for inhibiting spontaneous corrosion of said negative electrode a compound in access relation to said electrolyte from the group consisting of barium potassium chromate, barium sodium chromate and barium ammonium chromate.

5. In a current-producing primary cell having a positive electrode and a magnesium negative electrode and an aqueous bromide electrolyte in contact with said electrodes; for inhibiting spontaneous corrosion of said negative electrode barium potassium chromate in access relation to said electrolyte.

6. In a current producing primary cell having a positive electrode and a magnesium negative electrode and an aqueous bromide electrolyte in contact with said electrodes; for inhibiting spontaneous corrosion of said negative electrode barium sodium chromate in access relation to said electrolyte.

7. In a current producing primary cell having a positive electrode and a magnesium negative electrode and an aqueous bromide electrolyte in contact with said electrodes; for inhibiting spontaneous corrosion of said negative electrode barium ammonium chromate in access relation to said electrolyte.

IVAN C. BLAKE.

REFERENCES CITED

The following references are of record in the file of this patent:

UNITED STATES PATENTS

| Number | Name | Date |
|---|---|---|
| 1,839,498 | Porth | Jan. 5, 1932 |
| 2,422,045 | Ruben | June 10, 1947 |
| 2,491,640 | Blake | Dec. 20, 1949 |